United States Patent
Nakano et al.

(10) Patent No.: US 9,932,015 B2
(45) Date of Patent: Apr. 3, 2018

(54) BLADE RUBBER AND VEHICLE WIPER DEVICE

(71) Applicant: ASMO CO., LTD., Shizuoka-ken (JP)

(72) Inventors: Hiroyuki Nakano, Kosai (JP); Sohei Yamada, Hamamatsu (JP)

(73) Assignee: ASMO CO., LTD., Shizuoka-ken (JP)

( * ) Notice: Subject to any disclaimer, the term of this patent is extended or adjusted under 35 U.S.C. 154(b) by 332 days.

(21) Appl. No.: 14/226,562

(22) Filed: Mar. 26, 2014

(65) Prior Publication Data
US 2014/0298608 A1   Oct. 9, 2014

(30) Foreign Application Priority Data

Apr. 3, 2013   (JP) ................. 2013-077570
Dec. 19, 2013  (JP) ................. 2013-262700

(51) Int. Cl.
*B60S 1/38* (2006.01)

(52) U.S. Cl.
CPC .............. *B60S 1/38* (2013.01); *B60S 1/3801* (2013.01); *B60S 1/3881* (2013.01); *B60S 2001/3829* (2013.01); *B60S 2001/3836* (2013.01)

(58) Field of Classification Search
CPC ...... B60S 2001/3829; B60S 2001/3836; B60S 2001/3832; B60S 1/3881
USPC ..................................................... 15/250.48
See application file for complete search history.

(56) References Cited

U.S. PATENT DOCUMENTS 1,853,715 A * 4/1932 Anderson ............. B60S 1/38
                                                15/245
3,081,477 A * 3/1963 Ridenour ............. B60S 1/3801
                                                15/250.3
3,418,679 A * 12/1968 Barth ................. B60S 1/3806
                                                15/250.201
4,317,251 A   3/1982 Priesemuth
5,056,183 A * 10/1991 Haney, III ............. B60S 1/38
                                                15/250.48

(Continued)

FOREIGN PATENT DOCUMENTS

DE    2627832 A1 *  1/1978 ............ B60S 1/3806
DE    27 22 135 A1  11/1978
(Continued)

OTHER PUBLICATIONS

WO2011029660A1 (machine translation), 2011.*
DE2627832A1 (machine translation), 1978.*

*Primary Examiner* — Andrew A Horton
(74) *Attorney, Agent, or Firm* — Christensen, Fonder, Dardi & Herbert PLLC

(57) ABSTRACT

A blade rubber has an elongate shape extending along a longitudinal direction. The blade rubber includes a basal portion retained by a rubber holder and a wiping portion extending downward from the basal portion. The wiping portion slidably contacts and wipes a wiped surface along a width direction. The wiping portion has a cross-sectional shape, which inclines with respect to a downward hanging direction when the blade rubber is in an unloaded state. The cross-sectional shape is a shape of a cross-sectional surface of the wiping portion. The cross-sectional surface extends along a direction perpendicular to the longitudinal direction. The downward hanging direction is a direction, which extends along a direction perpendicular to the longitudinal direction and the width direction.

16 Claims, 11 Drawing Sheets

(56) References Cited

U.S. PATENT DOCUMENTS

| | | | | |
|---|---|---|---|---|
| 5,107,563 | A | * 4/1992 | Zimmerman | ............. B60S 1/38 |
| | | | | 15/250.48 |
| 5,893,193 | A | 4/1999 | Nagy | |
| 6,038,729 | A | 3/2000 | Feigenbaum | |
| 2003/0233722 | A1 | 12/2003 | Sawamura et al. | |
| 2004/0148728 | A1 | 8/2004 | Vogt et al. | |
| 2008/0301897 | A1 | 12/2008 | Shoup | |
| 2009/0000052 | A1 * | 1/2009 | Reiner | ................. B05B 15/045 |
| | | | | 15/250.48 |
| 2010/0064468 | A1 * | 3/2010 | Kang | ..................... B60S 1/381 |
| | | | | 15/250.48 |

FOREIGN PATENT DOCUMENTS

| | | |
|---|---|---|
| JP | S56-91153 U | 12/1979 |
| JP | 57-030646 A | 2/1982 |
| JP | 10-007903 A | 1/1998 |
| JP | H11-505490 A | 5/1999 |
| JP | 11-180263 A | 7/1999 |
| JP | 2000-255389 A | 9/2000 |
| JP | 2001-080472 A | 3/2001 |
| JP | 2001-322535 A | 11/2001 |
| JP | 2002-20512 A | 1/2002 |
| JP | 2003-081066 A | 3/2003 |
| JP | 2004-17948 A | 1/2004 |
| JP | 2004-525032 A | 8/2004 |
| JP | 2006-076505 A | 3/2006 |
| SE | 446 707 B | 10/1986 |
| WO | WO 2004/101335 A1 | 11/2004 |
| WO | WO 2011029660 A1 * | 3/2011 .............. B60S 1/381 |

* cited by examiner

BLADE RUBBER AND VEHICLE WIPER DEVICE

BACKGROUND OF THE INVENTION

The present invention relates to a blade rubber and a vehicle wiper device.

Conventionally, a wiper blade for a vehicle wiper device includes a lever member and a blade rubber having an elongate shape. The blade rubber includes a basal portion, which is gripped by the lever member and a wiping portion, which extends downward from the basal portion to wipe a wiped surface.

A common blade rubber includes a neck portion located between a basal portion and a wiping portion. In an unloaded state, the neck portion extends in a downward hanging direction perpendicular to a width direction. During a wiping operation, the neck portion bends so that the wiping portion inclines downward and toward an opposite side of a travelling direction. The wiping portion slidably contacts a wiped surface in an inclined posture and wipes the wiped surface. When this blade rubber is in a reversing operation, the wiping portion changes its extending direction to cross over the downward hanging direction so that the wiping portion extends toward a different side, while the blade rubber rapidly moves upward and downward. This generates an impact noise, i.e., a reversing operation noise.

For example, Japanese Laid-Open Patent Publication 2001-322535 discloses a wiping portion, which includes a hollow portion extending in a longitudinal direction and projecting portions, which project toward two opposite sides in a width direction. This structure is directed to prevent a generation of the reversing operation noise.

However, the blade rubber described above increases rigidity in the wiping portion in an up/down direction, and is not likely to be deformed elastically in the up/down direction. This may lower the ability of the blade rubber to follow a curved wiped surface and lower the wiping ability.

SUMMARY OF THE INVENTION

The objective of the present invention is to provide a blade rubber and a vehicle wiper device capable of reducing a reversing operation noise while maintaining the wiping ability.

To achieve the foregoing objective, a blade rubber having an elongate shape and extending along a longitudinal direction includes a basal portion and a wiping portion. The basal portion is retained by a rubber holder. The wiping portion extends downward from the basal portion. The wiping portion slidably contacts and wipes a wiped surface along a width direction. The wiping portion has a cross-sectional shape, which inclines with respect to a downward hanging direction when the blade rubber is in an unloaded state. The cross-sectional shape is a shape of a cross-sectional surface of the wiping portion. The cross-sectional surface extends along a direction perpendicular to the longitudinal direction. The downward hanging direction is a direction, which extends along a direction perpendicular to the longitudinal direction and the width direction.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereafter, discussion will be made on one embodiment of a vehicle wiper device according to FIGS. 1 to 5.

Figure 1:
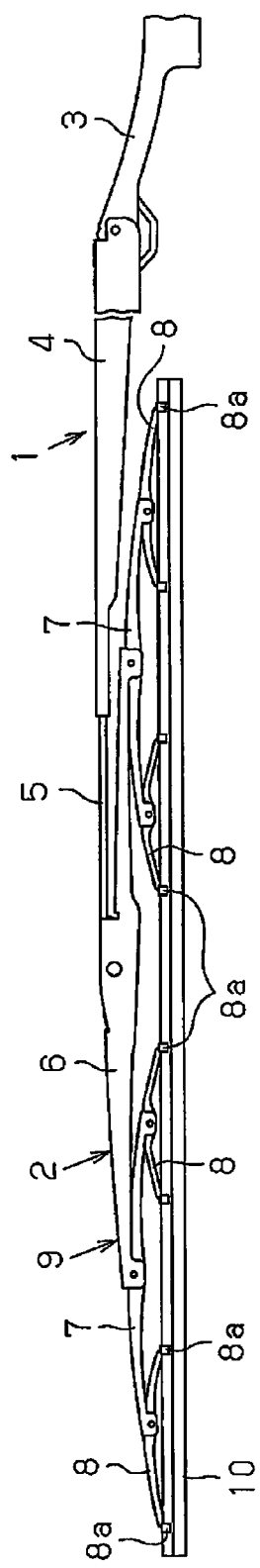
FIG. 1 is a side elevation view of a vehicle wiper according to one embodiment of the present invention.

As shown in FIG. 1, a vehicle wiper of a vehicle wiper device includes a wiper arm 1 and a wiper blade 2, which connects with the wiper arm 1. As shown in FIG. 4, the vehicle wiper device according to this embodiment is used to wipe rain drops or the like on a front windshield G serving as a wiped surface of a vehicle. A stop position of the vehicle wiper device is set at a lower end of the front windshield G. The vehicle wiper device extends substantially along a lower side of the front windshield G when positioned at the stop position.

The wiper arm 1 includes an arm head 3, a retainer 4 and an arm piece 5. The arm head 3 has a basal end fixed with a pivot shaft (not shown), which is pivotally moved by a wiper motor (not shown) in back and forth within a predetermined angle range. The retainer 4 connects with a distal end of the arm head 3 to be pivotally moved. The retainer 4 has a distal end, which is biased by a biasing mechanism towards the front windshield G. The distal end of the retainer 4 is fixed with the arm piece 5. The wiper blade 2 is connected with a distal end part of the arm piece 5 to be pivotally moved.

The wiper blade 2 includes a lever assembly 9 serving as a rubber holder. The lever assembly 9 includes a primary lever 6, one pair of secondary levers 7 and two pairs of yokes 8. The primary lever 6 connects with the wiper arm 1 (arm piece 5) to be pivotally moved. The secondary levers 7 connect with two opposite ends of the primary lever 6, respectively, to be pivotally moved. The yokes 8 connect with two opposite ends of each of the secondary lever 7, respectively, to be pivotally moved. Each yoke 8 includes gripping portions 8a arranged at two opposite ends of the yoke 8.

Figure 2:
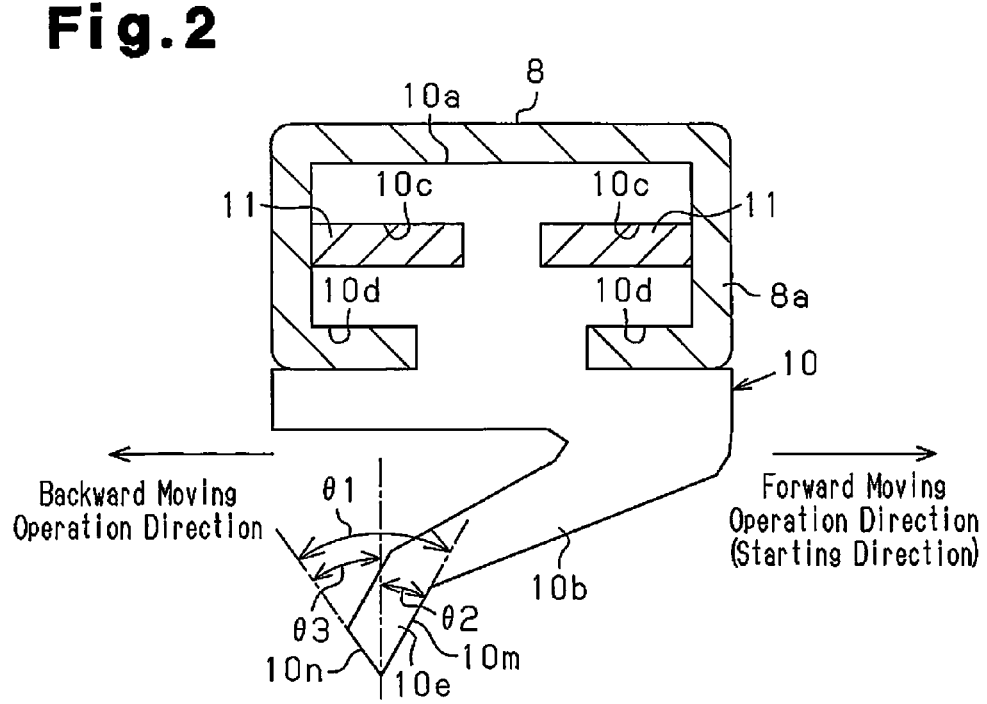
FIG. 2 is a partial cross-sectional view of the vehicle wiper in FIG. 1.

As shown in FIGS. 1 and 2, the wiper blade 2 includes a blade rubber 10, which has an elongate shape and a pair of backings 11. A plurality of gripping portions 8a grip the blade rubber 10 at a plurality of portions (eight portions in this embodiment) in a longitudinal direction. The pair of backings 11 are attached to the blade rubber 10.

The blade rubber 10 includes a basal portion 10a and a wiping portion 10b. The basal portion 10a is gripped by the gripping portions 8a. The wiping portion 10b extends downward (extends toward the front windshield G when mounted on the vehicle) from the basal portion 10a. The wiping portion 10b slidably contacts and wipes the front windshield G along a width direction (directions along forward and backward moving operations in FIG. 2).

FIG. 2 shows a cross-section of the vehicle wiper that is perpendicular to the longitudinal direction. The basal portion 10a is formed with backing accommodation grooves 10c and gripped grooves 10d, which extend along the longitudinal direction. The backing accommodation groove 10c is arranged at a part of the basal portion 10a that is located at a center in an up/down direction and located at two opposite ends in the width direction of the basal portion 10a. Each gripped groove 10d is arranged at a portion located below each of the backing accommodation grooves 10c arranged at two opposite ends of the basal portion 10a in the width direction. The backing accommodation groove 10c accommodates the backing 11, which is made of a metal and applies rigidity and elasticity to the blade rubber 10. A distal end of the gripping portion 8a fits in the gripped groove 10d. The gripping portion 8a grips the basal portion 10a and the backing 11.

As shown in FIG. 2, the wiping portion 10b has an elongate plate shape extending along the longitudinal direction of the blade rubber 10. The wiping portion 10b has a cross-sectional shape, which inclines with respect to a downward hanging direction (downward direction in FIG. 2) when the blade rubber 10 is in an unloaded state. The cross-sectional shape refers to a shape of a cross-section of the wiping portion 10b that extends in a direction perpendicular to the longitudinal direction. The downward hanging direction refers to a direction extending along a direction perpendicular to the longitudinal direction and the width direction. In one embodiment of the present invention, the downward hanging direction is a same direction as the above-described up/down direction.

In other words, an inclination direction of the wiping portion 10b inclines with respect to the downward hanging direction when the blade rubber 10 is in the unloaded state. The inclination direction of the wiping portion 10b refers to an extending direction of the wiping portion 10b, which extends from a contacting position between the front windshield G and the wiping portion 10b toward the basal portion 10a.

The wiping portion 10b is configured so that the inclination direction of the wiping portion 10b does not cross over the downward hanging direction during a wiping operation of the wiper arm 1 that includes a reversing operation according to the pivotal movement of the wiper arm 1 in back and forth. In other words, the extending direction of the wiping portion 10b is maintained to direct one side so that the extending direction does not cross over the downward hanging direction to incline toward the other side. That is, an inclination angle between the extending direction and the inclination direction of is set to be between 0° to 90° during the wiping operation of the wiping portion 10b that includes a reversing operation. This configuration is determined, for example, by actually carrying out the wiping operation on the front windshield G, which is in a normal state on which a large object is not adhered, or by a calculation taking into consideration a biasing force (a pushing force) by the biasing mechanism and a friction resistance.

The wiping portion 10b inclines to extend downward and toward the opposite side of a starting direction (a rightward direction in FIG. 2) of the blade rubber 42 from the stop position at the time of starting the wiping. The wiping portion 10b according to this embodiment projects from an end part of the basal portion 10a that is located at the starting direction side (a right side in FIG. 2) of the basal portion 10a.

The wiping portion 10b includes a distal end inclined portion 10e, which is arranged at a lower end part of the wiping portion 10b. An inclination direction of the distal end inclined portion 10e is closer to the downward hanging direction (a downward direction in FIG. 2) than the inclination direction of an upper part of the wiping portion 10b. In other words, an angle formed between the inclination direction of the distal end inclined portion 10e and the downward hanging direction is smaller than an angle formed between the inclination direction of the upper part of the wiping portion 10b and the downward hanging direction. The distal end inclined portion 10e inclines so that an angle (θ2), which is less than 45° is formed between the inclination direction of the distal end inclined portion 10e and the downward hanging direction (the downward direction in FIG. 2) in the unloaded state. The upper part of the wiping portion 10b with respect to the distal end inclined portion 10e inclines so that an angle, which is greater than or equal to 45° is formed between the inclination direction of the upper part of the wiping portion 10b and the downward hanging direction (the downward direction in FIG. 2) in the unloaded state.

Figure 4A:
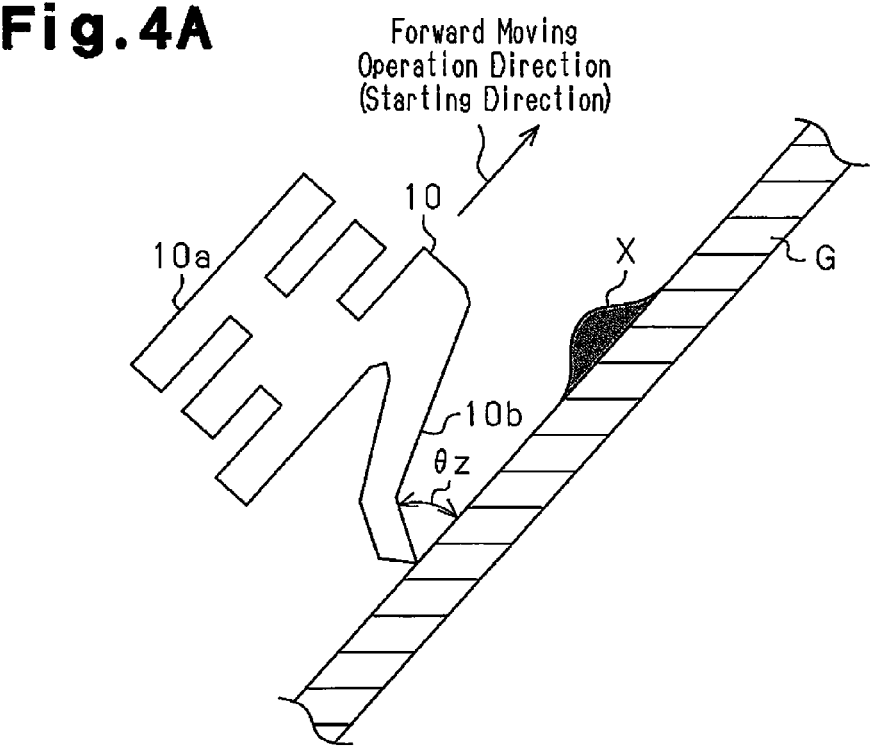
FIGS. 4A and 4B are schematic views for explaining an operation of a forward moving operation of the vehicle wiper in FIG. 2.
Figure 5A:
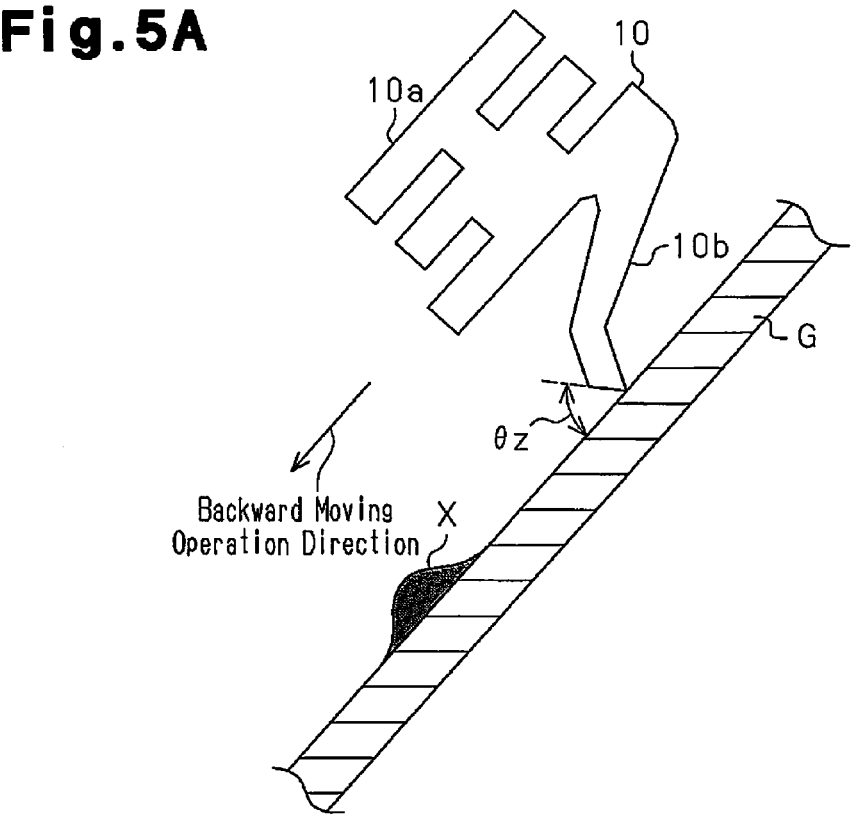
FIGS. 5A and 5B are schematic views for explaining an operation of a backward moving operation of the vehicle wiper in FIG. 2.

The wiping portion 10b includes a distal end portion. In this embodiment, the distal end inclined portion 10e corresponds to the distal end portion. The distal end portion has a width, which become narrower toward the front windshield G. This width is defined by a first surface 10m, which is located at a preceding side of the wiping portion 10b in a traveling direction during the forward moving operation, and a second surface 10n, which is located at a preceding side of the wiping portion 10b in a traveling direction during the backward moving operation. As shown in FIG. 4A, during the forward moving operation, a first angle θz is formed between the first surface 10m and a part of the front windshield G that is located at a preceding side in a traveling direction with respect to the wiping portion 10b. As shown in FIG. 5A, during the backward moving operation, a second angle θz is formed between the second surface 10n and a part of the front windshield G that is located at a preceding side in a traveling direction with respect to the wiping portion 10b. The first angle θz is substantially the same as the second angle θz. The angle θz is a contacting angle of the distal end of the wiping portion 10b with respect to the part of the front windshield G in the traveling direction.

As shown in FIG. 2, when viewing the wiping portion 10b in the longitudinal direction, an angle θ1, which is less than 90°, is formed between two opposite side surfaces of the distal end part of the wiping portion 10b. An angle θ2 is formed between the downward hanging direction and the first surface 10m, which is located at a forward moving operation side (right side in FIG. 2). An angle θ3 is formed between the downward hanging direction and the second surface 10n, which is located at a backward moving operation side (left side in FIG. 2). The angle θ2 is smaller than the angle θ3 in the unloaded state. That is, the wiping portion 10b tilts larger during the forward moving operation than when the blade rubber 10 is in the unloaded state so that the inclination angle with respect to the downward hanging direction increases. In other words, the angle θ2 increases while the angle θ3 decreases. This moves the basal portion 10a downward. The wiping portion 10b rises by a small amount during the backward moving operation so that the inclination direction approaches the downward hanging direction. In other words, the angle θ2 decreases while the angle θ3 increases. This moves the basal portion 10a upward.

Taking into consideration with the above, the angle θ2 and the angle θ3 are set so that the angle θz is constant between the front windshield G and a part of the distal end of the wiping portion 10b that is located at the preceding side in the traveling direction both during the forward moving operation and during the backward moving operation. This setting is determined, for example, by actually carrying out the wiping operation on the front windshield G, which is in a normal state on which a large object is not adhered, or by a calculation taking into consideration a biasing force (a pushing force) by the biasing mechanism and a friction resistance.

Figure 3:
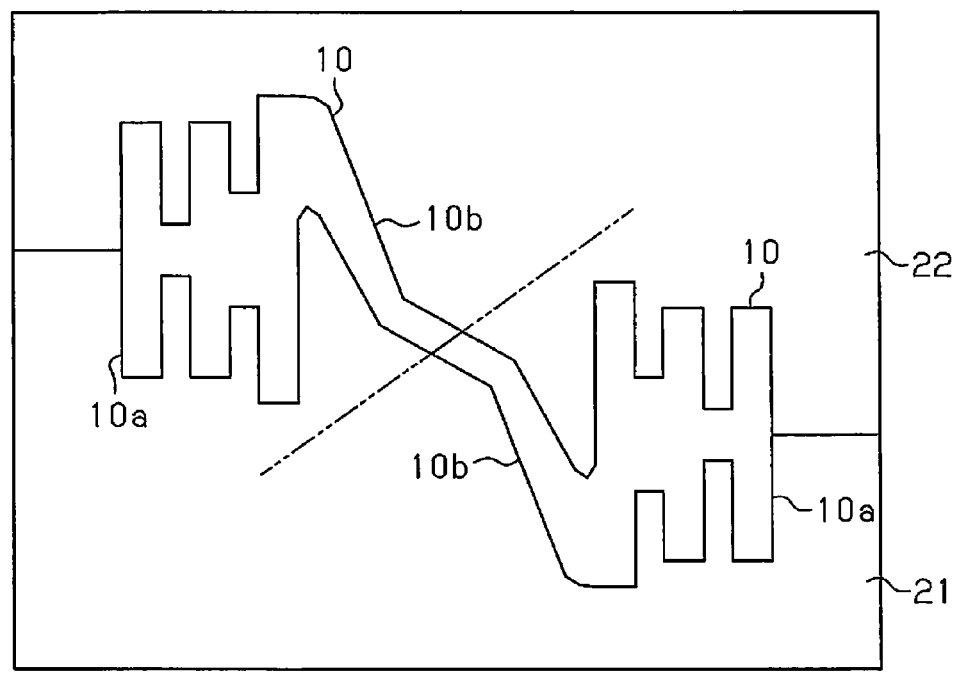
FIG. 3 is a schematic view for explaining a method of manufacturing a blade rubber in FIG. 2.

As shown in FIG. 3, the blade rubber 10 is manufactured by a press forming using a lower die 21 and an upper die 22. The press forming is carried out to manufacture a pressed part, which has a shape in which two distal ends of two wiping portions 10b of two blade rubbers 10 have been connected to each other. Subsequently, the pressed part is cut into two parts along a chain double-dashed line shown in FIG. 3 so that the angle θ1 is formed.

Next, operation of the vehicle wiper device configured as discussed above will be explained.

When the wiper motor is initiated, the wiper blade 2 located at the stop position (lower end of the front windshield G) starts the forward and backward moving operations. The wiping portion 10b tilts further with respect to the downward hanging direction so that the basal portion 10a moves downward by a small amount. In this state, the distal end of the wiping portion 10b slidably contacts the front windshield G to wipe the front windshield G.

Figure 4B:
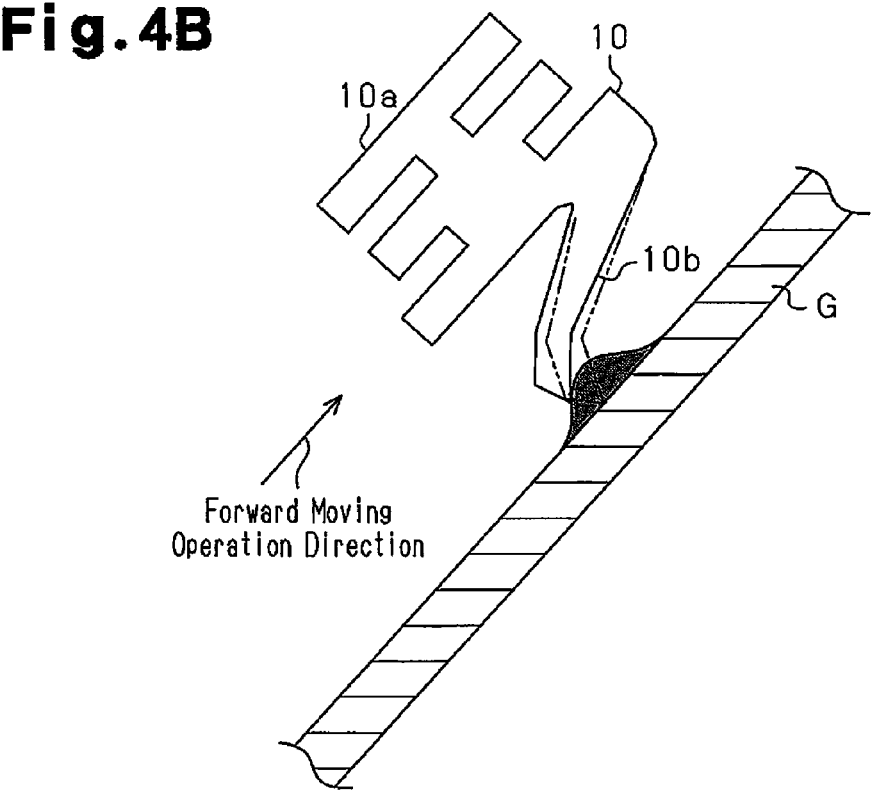

As shown in FIG. 4A, during the forward moving operation, a small object X, such as bird droppings may be adhered on the front windshield G, for example. When the wiping portion 10b travels over the small object X, the distal end of the wiping portion 10b moves so as to be pulled obliquely upward and toward the basal portion. Accordingly, as shown in FIG. 4B, the distal end of the wiping portion 10b slides on and easily travels over the object X.

When the wiper blade 2 reaches the reversing position, the wiper blade 2 reverses the moving direction and starts the backward moving operation. The wiping portion 10b rises by a small amount so as to approach the downward hanging direction. This moves the basal portion 10a upward by a small amount. In this state, the distal end of the wiping portion 10b slidably contacts the front windshield G to wipe the front windshield G.

Figure 5B:
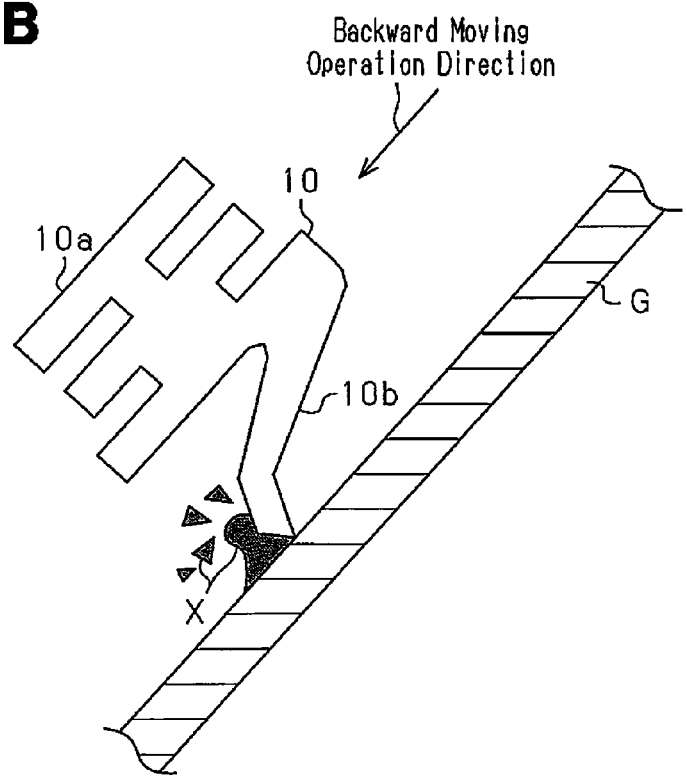

As shown in FIG. 5A, during the backward moving operation, when the wiping portion 10b contacts the object X, the distal end of the wiping portion 10b is pushed and moves obliquely upward and toward the basal portion side. As shown in FIG. 5B, when the distal end of the wiping portion 10b collides with the object X, a reacting force, which is generated by the collision, is received by the basal portion located at obliquely upward position. Accordingly, the distal end of the wiping portion 10b can scrape and remove the object X.

Next, characteristic advantages according to the above discussed embodiment are described.

(1) The wiping portion 10b has the cross-sectional shape, which inclines with respect to the downward hanging direction when the blade rubber 10 is in an unloaded state. In addition, the wiping portion 10b of the present embodiment is configured so that the inclination direction of the wiping portion 10b does not cross over the downward hanging direction during the wiping operation that includes the reversing operation. That is, both during the forward moving operation and during the backward moving operation, the inclination direction of the wiping portion 10b is maintained to direct one side so that the inclination direction does not cross over the downward hanging direction to incline toward the other side. This prevents the blade rubber 10 from abruptly moving upward and downward and reduces the reversing operation noise, which generates at this time. During the reversing operation, the present invention only causes generation of any one of the upward and downward moving operations, but does not cause generation of both the upward and downward moving operations due to the reversing of the inclined posture as in conventional structure. Thus, it is possible to obtain an effect of reducing the reversing operation noise more concretely.

In addition, the wiping portion 10b inclines with respect to the downward hanging direction. This reduces the rigidity in the up/down direction, and facilitates a resilient deformation in the up/down direction (in other words, curvature deformation in the longitudinal direction). Accordingly, the present invention improves ability to follow the curved wiped surface, and maintains the wiping ability.

(2) The wiping portion 10b includes the distal end inclined portion 10e arranged on the lower end of the wiping portion 10b. The inclination direction of the distal end inclined portion 10e is closer to the downward hanging direction than the inclination direction of the upper part of the wiping portion 10b. Accordingly, the angle between the distal end of the wiping portion 10b and the front windshield G in the traveling direction (the contacting angle of the wiping portion 10b with respect to the front windshield G) can be optimized while facilitating an elastic deformation in the up/down direction. This reduces sliding resistance and improves wiping ability. Specifically, assuming that a wiping portion inclines largely with respect to the downward hanging direction when the wiping portion does not include a distal end inclined portion, such a configuration facilitates the elastic deformation of the wiping portion in the up/down direction while making an angle between the distal end of the wiping portion and the wiped surface in the traveling direction be smaller than an optimize angle. This increases the sliding resistance, while deteriorating wiping ability. The structure of the present invention overcomes these disadvantages.

(3) The wiping portion 10b includes the distal end portion. The distal end portion has a width, which become narrower toward the front windshield. The width is defined by the first surface 10m, which is located at the preceding side of the wiping portion 10b in the traveling direction during the forward moving operation, and the second surface 10n, which is located at the preceding side of the wiping portion 10b in the traveling direction during the backward moving operation. During the forward moving operation, the first angle θz is formed between the first surface 10m and the part of the front windshield G that is located at the preceding side in the traveling direction with respect to the wiping portion 10b. During the backward moving operation, the second angle θz is formed between the second surface 10n and the part of the front windshield G that is located at the preceding side in the traveling direction with respect to the wiping portion 10b. The first angle θz is substantially the same as the second angle θz. Accordingly, similar wiping ability can be obtained during the frontward moving operation and during the backward moving operation.

(4) The wiping portion 10b inclines to extend downward and toward the opposite side of the starting direction at the time of starting the wiping. This allows for a starting operation to be smooth as compared to a structure in which the wiping portion 10b inclines to extend toward the starting direction at the time of starting the wiping. For example, assuming that the wiping portion 10b inclines to extend toward a direction opposite to that in the above-described configuration, and weak adhesion is generated between the distal end of the wiping portion 10b located at the stop position and the front windshield G. In this case, the wiper blade starts to move so as to push the distal end of the wiping portion 10b. If the applied force is insufficient to release the adhesion, the wiping portion 10b may incline toward the opposite direction or may not start to move smoothly. In contrast, in the above-described structure, the distal end of the wiping portion 10b starts to move so as to be pulled. Accordingly, the present invention prevents the wiping portion 10b from being inclined toward the opposite direction and allows for a smooth starting.

The above-described embodiment may be changed as follows.

The blade rubber 10 may be changed to a blade rubber having other structure. That is, the wiping portion only has to have a cross-sectional shape that inclines with respect to the downward hanging direction when the blade rubber is in the unloaded state.

Figure 6:
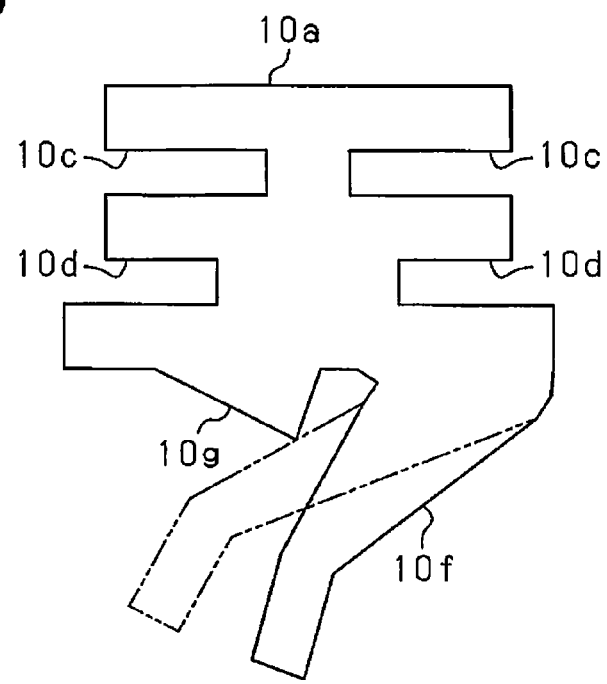
FIG. 6 is a schematic view showing a blade rubber in another example as viewed in a longitudinal direction.

For example, as shown in FIG. 6, the basal portion 10a may have a restriction projection 10g that restricts the wiping portion 10f from resiliently deforming upward from a predetermined position.

Figure 7:
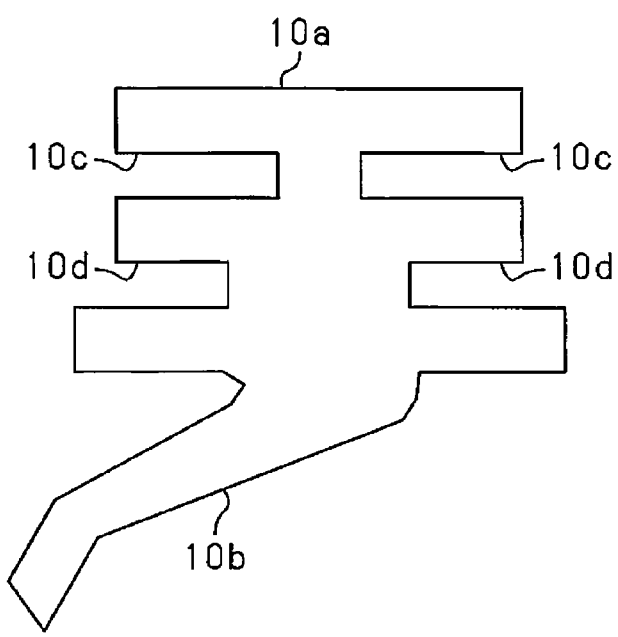
FIG. 7 is a schematic view showing a blade rubber in another example as viewed in a longitudinal direction.

For example, as shown in FIG. 7, the wiping portion 10b may project from a center of the basal portion 10a in the width direction.

Figure 8:
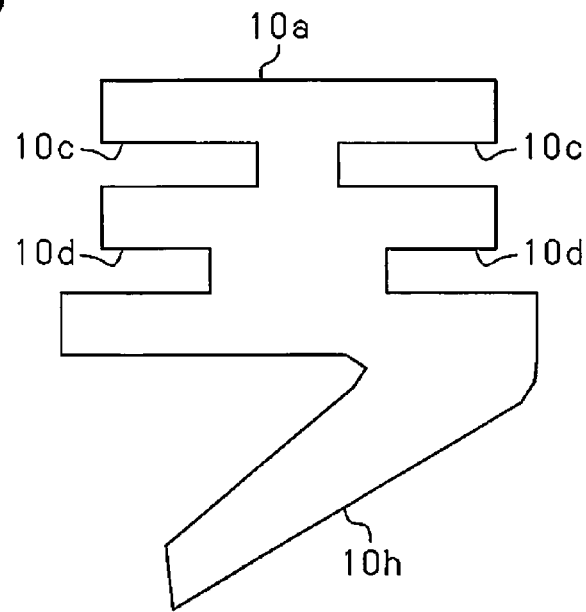
FIG. 8 is a schematic view showing a blade rubber in another example as viewed in a longitudinal direction.

For example, as shown in FIG. 8, the wiping portion 10h may not have the distal end inclined portion 10e described in the above-described embodiment.

Figure 9:
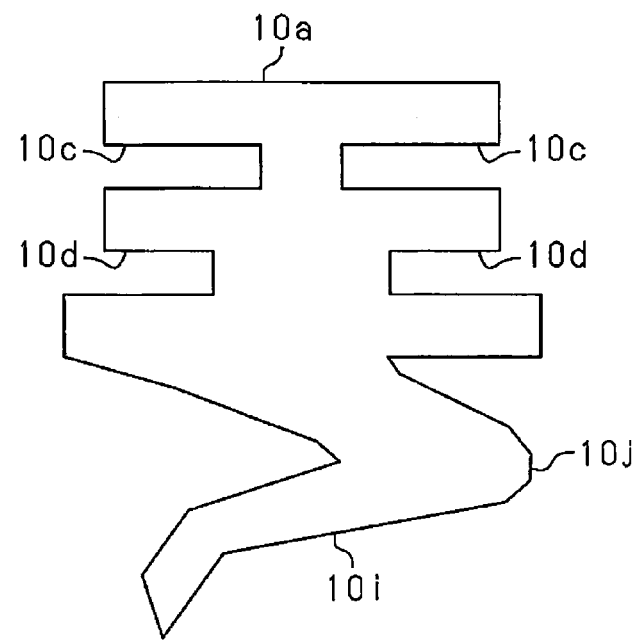
FIG. 9 is a schematic view showing a blade rubber in another example as viewed in a longitudinal direction.

For example, as shown in FIG. 9, the wiping portion 10i may have a bending portion 10j located at an intermediate part of the wiping portion 10i. The bending portion 10j changes an inclination direction of the wiping portion 10i.

Figure 10:
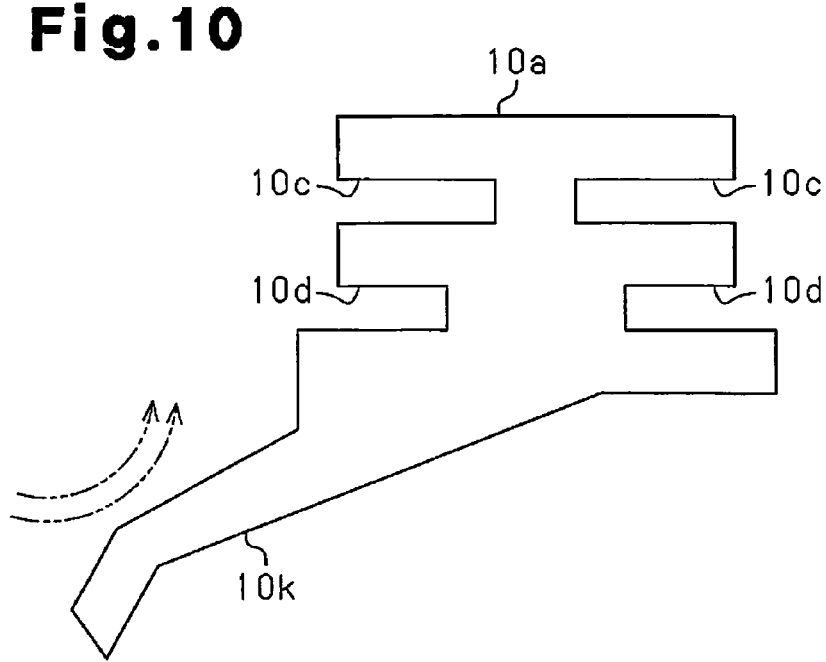
FIG. 10 is a schematic view showing a blade rubber in another example as viewed in a longitudinal direction.

For example, the wiping portion 10b in the embodiment may be changed to a wiping portion 10k as shown in FIG. 10. A basal portion 10a includes an opposite side end portion that faces toward an opposite side (left side in FIG. 10) of the starting direction at the time of starting the wiping. The wiping portion 10k projects from the opposite side end portion and extends toward the opposite side of the starting direction. The vehicle wiper device configured as described above is arranged in a stop position, which is set at the lower end of the front windshield G. In this configuration, the wiping portion 10k is capable of flowing air stream during vehicle running (see arrows of chain double-dashed lines in FIG. 10) smoothly upward and rearward in a vehicle. This reduces an operation resistance during the backward moving operation, for example. In addition, the air stream during vehicle running is changed to a pushing force that directly pushes the blade rubber 10. This suppresses the wiping portion 10k from rising off the front windshield G and improves the wiping ability.

The stop position of the vehicle wiper device is not limited to the position at the lower end of the front windshield G. In a symmetrical twin wiper device, the stop position may be set at an upper reversing position located along a vehicle pillar. In this configuration, the air stream during vehicle running flows from a front of the vehicle toward two opposite ends of the front windshield in the width direction. Accordingly, this reduces the operation resistance during the backward moving operation and suppresses the wiping portion from rising off the front windshield G.

In the above-described embodiment, the distal end part of the wiping portion 10b has a width, which becomes narrower toward the front windshield G. The angle θz is formed between the first surface 10m and the front windshield G. The angle θz is formed between the second surface 10n and the front windshield G. The angle θz is constant both during the forward moving operation and during the backward moving operation. The distal end part of the wiping portion 10b may have a shape, which is not configured as described above. For example, as shown in FIG. 6, the distal end portion has a shape that is obtained by cutting the distal end portion along a surface perpendicular to the two opposite side surfaces of the distal end portion.

In the above-described embodiment, the wiping portion 10b inclines to extend downward and toward the opposite side of the starting direction at the time of starting the wiping. The wiping portion 10b may extend in an opposite direction of the direction in the embodiment. That is, the wiping portion 10b may incline to extend downwards and towards the starting direction side.

In the above-described embodiment, the blade rubber 10 is manufactured by the press forming using the lower die 21 and the upper die 22. The embodiment is not limited to this. The blade rubber 10 may be manufactured by another method.

Figure 11:
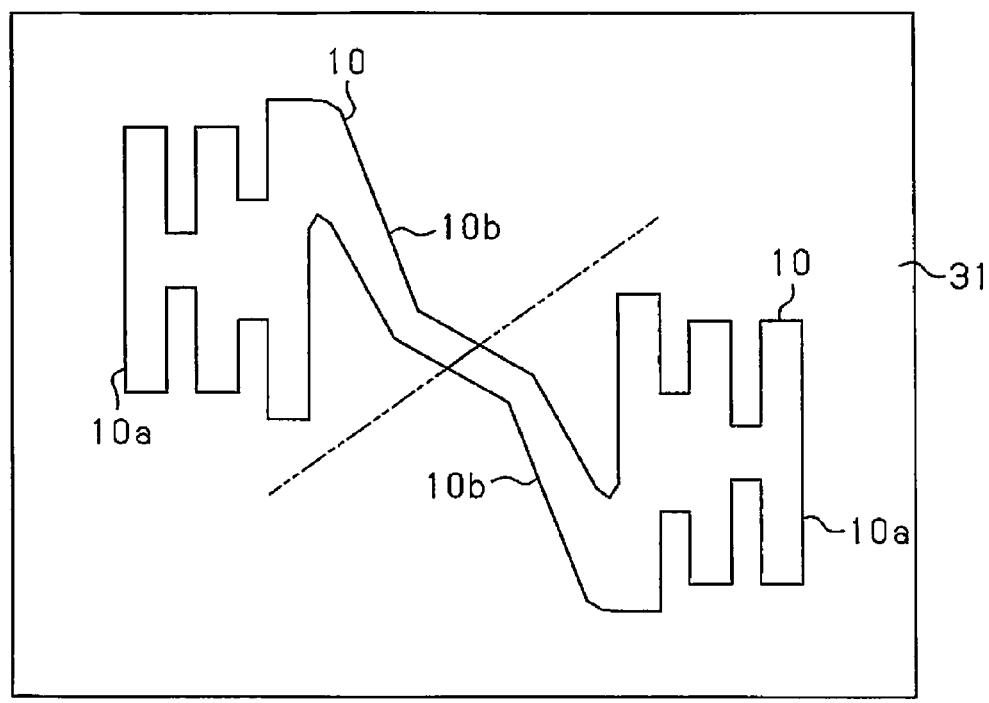
FIG. 11 is a schematic view for explaining a method for manufacturing a blade rubber in another example.

For example, as shown in FIG. 11, the blade rubber 10 may be manufactured by an extrusion using a die 31. Specifically, an extruded part, which has a shape in which two distal ends of two wiping portions 10b of two blade rubbers 10 have been connected to each other, is manufactured. Subsequently, the extruded part is cut into two parts along a chain double-dashed line shown in FIG. 11 so that the blade rubbers 10 are formed.

In the above-described embodiment, the rubber holder corresponds to the lever assembly 9, which includes the primary lever 6, the secondary lever 7, and the yoke 8. The embodiment is not limited to this. For example, the rubber holder may be a lever-less type, which does not have a lever. A rubber holder of the lever-less type only grips a longitudinal central part of the blade rubber 10. That is, the present invention may be applied to a so-called flat type wiper blade. In addition, in the above-described embodiment, the pair of backings 11 is received in the backing accommodation groove 10c of the basal portion 10a. The embodiment is not limited to this. For example, the basal portion 10a may not have the backing accommodation groove 10c. In this case, one backing may be arranged along a top surface of a basal portion and the rubber holder may grip the basal portion and the backing together. In addition, one backing may be received in and retained by a soft rubber holder.

Modified examples as discussed above are shown in FIG. 12A to 14.

Figure 12A:
FIG. 12A is a perspective view showing a wiper arm in another example.
Figure 12B:
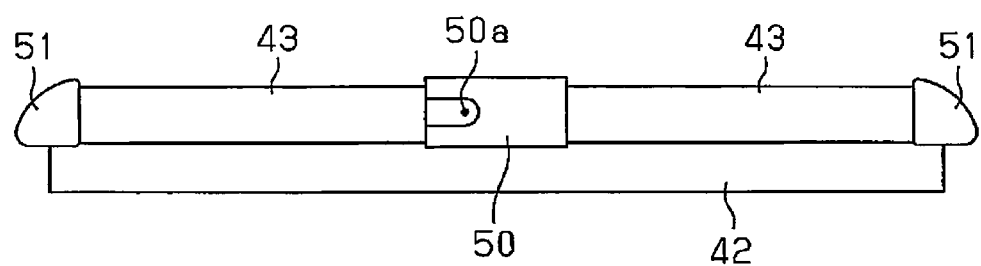
FIG. 12B is a schematic view of a wiper blade in another example.

As shown in FIG. 12A, a wiper arm 1 includes an arm side connecting portion 1a located at a distal end of the wiper arm 1. As shown in FIG. 12B, a connector 50 is arranged at a center of a blade rubber 42 in the longitudinal direction and connects with the arm side connecting portion 1a. The wiper arm 1 connects with the connector 50 through a pivot shaft portion 50a to be pivotally moved.

In this example, the rubber holder includes a pair of cases 43. The cases 43 are arranged at two opposite sides of the connector 50 in the longitudinal direction so that the connector 50 is located therebetween. Each case 43 is formed of soft resin material. Caps 51 are arranged respectively at two opposite ends of the rubber holder in the longitudinal direction, which includes two cases 43, in other words, arranged respectively at two opposite ends of a rubber receiving portion 43f.

Figure 13:
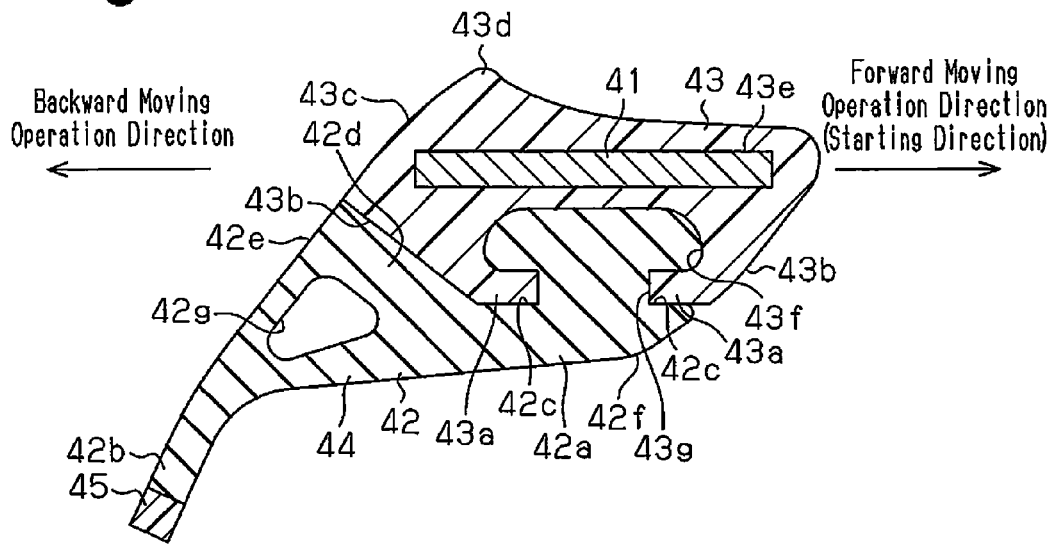
FIG. 13 is a cross-sectional view of a vehicle wiper in another example.
Figure 14:
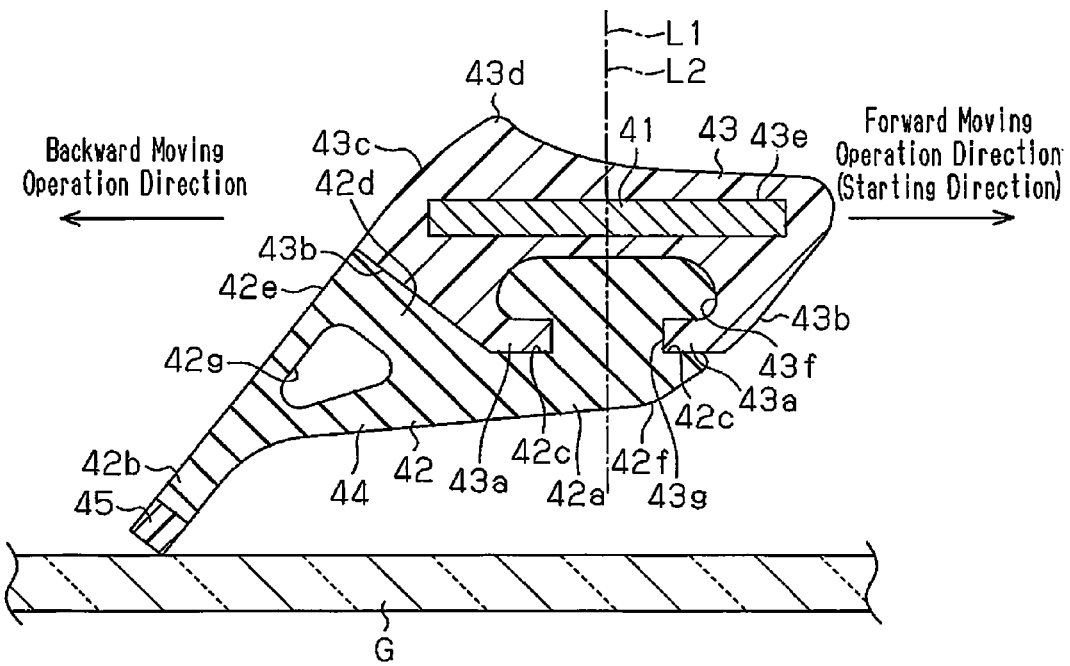
FIG. 14 is a cross-sectional view of a vehicle wiper in another example.

As shown in FIG. 13, the case 43 includes a backing receiving portion 43e and a rubber receiving portion 43f. The backing receiving portion 43e receives and retains one backing 41 therein. The rubber receiving portion 43f is located at a part of the case 43 closer to the front windshield G than the backing receiving portion 43e and extends along the longitudinal direction. The backing 41 having a plate shape is received so that a plate surface extends parallel with the width direction (the direction along the forward and backward moving operations), which extends substantially along the front windshield G. The backing 41 extends along the longitudinal direction of the wiper blade 2 so as to apply spring resilience to the blade rubber 42.

The rubber receiving portion 43f receives and retains (grips) substantially entire part of the basal portion 42a of the blade rubber 42 in the longitudinal direction. The rubber receiving portion 43f includes a longitudinal slit 43g, which extends along the longitudinal direction and opens toward the front windshield G. As shown in FIG. 12B, the caps 51 are arranged respectively at two opposite ends of the rubber holder in the longitudinal direction, which includes two cases 43, in other words, arranged respectively at two opposite ends of the rubber receiving portion 43f.

The case 43 includes a pair of gripping portions 43a located at a lower portion (lower portion in FIGS. 13 and 14) of the case 43. The gripping portions 43a project inward in the width direction, respectively, and grip the basal portion 42a. An outer surface of each of the gripping portions 43a in the width direction forms a width extending surface 43b. The width extending surface 43b extends outward in the width direction and away from the wiped surface (above in FIGS. 13 and 14). A center L1 between the gripping portions 43a in the width direction coincides with a center L2 of the backing 41 in the width direction.

The blade rubber 42 includes a basal portion 42a and a wiping portion 42b, which extends downward (i.e., toward the front windshield G when assembled in the vehicle) from the basal portion 42a. That is, the wiping portion 42b connects with a part of the basal portion 42a that is located in the rubber receiving portion 43f through the longitudinal slit 43g. The wiping portion 42b slidably contacts the front windshield G to wipe the front windshield G along the width direction (left/right direction in FIG. 14). The wiping portion 42b of the blade rubber 42 extends so as to incline with respect to the downward hanging direction (downward direction in FIG. 13) perpendicular to the width direction.

The basal portion 42a includes a pair of gripped groove 42c, which are located at two opposite sides of the basal portion 42a in the width direction and extend along the longitudinal direction. The gripped groove 42c receives a distal end part of the gripping portion 43a so that the basal portion 42a is gripped by the gripping portion 43a. This assembling is made by moving the blade rubber 42 and the case 43 relative to each other in the longitudinal direction while inserting the gripping portion 43a into the gripped groove 42c. The caps 51 arranged at two opposite sides of the cases 43 in the longitudinal direction prevent the blade rubber 42 from moving in the longitudinal direction with respect to the rubber receiving portion 43f.

As shown in FIG. 13, the wiping portion 42b has a cross-sectional shape that inclines with respect to the downward hanging direction (downward in FIG. 13) perpendicular to the width direction (a direction substantially along the front windshield G, or left/right direction in FIG. 13) when the blade rubber 42 is in the unloaded state.

Specifically, the basal portion 42a includes a supporting and contacting portion 42d, which contacts and is supported by the width extending surface 43b located at an opposite side of the starting direction at the time of starting the wiping. The wiping portion 42b extends from the supporting and contacting portion 42d. The wiping portion 42b extends downward and toward the opposite side of the starting direction at the time of starting the wiping.

The wiping portion 42b includes a lowest portion and a resin member 45, which connects with the lowest portion. At least the basal portion 42a in the wiping portion 42b is formed by a resilient member 44. The resin member 45 is harder than the resilient member 44. The resin member 45 is formed from a material, which is in the same series as the resilient member 44 and has compatibility with the resilient member 44. The compatibility means the nature by which equal to or more than two substances have affinity to each other to form solution or compound.

Specifically, in this example, the basal portion 42a and a part of the wiping portion 42b other than the lowest portion (resin member 45) is formed by the resilient member 44. The resilient member 44 is formed from thermoplastic elastomer polyester (TPEE), for example.

The resin member 45 is formed from polyethylene terephthalate (PET), which is in ester series, for example. Accordingly, the resin member 45 is harder than the resilient member 44. It is preferable that the resin member 45 has a low friction coefficient. That is, when applying constant load to the resin member 45 and the resilient member 44, the resin member 45 has a deformation amount, which is smaller than that of the resilient member 44. The resin member 45 is in the same series as the resilient member 44 and has compatibility with the resilient member 44.

The resin member 45 has a cross-sectional area, which is determined based on the insertion force when assembling the case 43 with the blade rubber 42, and the tensile strength of the resin member 45. That is, the cross-sectional area of the resin member 45 is determined so that a value obtained by multiplying the tensile strength of the resin member 45 by the cross-sectional of the resin member 45 is larger than the insertion force when assembling. This prevents the resin member 45 from being divided into parts in the longitudinal direction when assembling.

The cross-sectional shape of the resin member 45 includes two side surfaces, which are parallel to each other and arranged in the width direction of the resin member 45, a distal surface, which extends so as to form right angles with the two side surfaces, and corners formed by the two side surfaces and the distal surface. The corner of the resin member 45 contacts the front windshield G.

The basal portion 42a and the case 43 include inclination surfaces 42e, 43c, which are arranged at the opposite side of the starting direction at the time of stating the wiping. The inclination surfaces 42e, 43c extend obliquely upward (opposite side of the downward hanging direction, upward in FIGS. 13 and 14) in the cross-section, which is perpendicular to the longitudinal direction. That is, the inclination surfaces 42e, 43c extend toward the starting direction and incline by a rising slope. The inclination surfaces 42e, 43c continue to each other without having a step difference. The inclination surfaces 42e, 43c are formed entirely at portions of the blade rubber 42 and the case 43 that are arranged at the opposite side of the starting direction at the time of starting the wiping. That is, the blade rubber 42 includes the inclination surface 42e, which is formed continuously on the basal portion 42a (supporting and contacting portion 42d) and on the wiping portion 42b. "The inclination surfaces 42e, 43c continue to each other without having a step" means that the inclination surfaces 42e, 43c do not includes a portion, which does not incline upward (upward in FIGS. 13 and 14) and toward the starting direction. The inclination surfaces 42e, 43, which do not include the step differences, are not limited to flat surfaces. The inclination surfaces 42e, 43c are curved in this example.

The case 43 has an upper portion. The upper portion includes a convex part 43d arranged at the opposite side of the wiping direction. The convex part 43d increases a surface area of the inclination surface 43c.

The basal portion 42a of the blade rubber 42 includes an impact absorbing portion 42f. For example, when releasing a lock back state of the vehicle wiper, the case 43 is brought into contact with the front windshield G and receives an impact (force) from the front windshield G. The impact is greater than a normal biasing force, which is generated by the biasing mechanism to push for the wiping portion 42b so as to keep contact with the front windshield G. The impact acts on the case 43 in a direction same as a direction of the biasing force from the biasing mechanism. The impact absorbing portion 42f is arranged at a part of the blade rubber 42 that contacts the front windshield G at a time after the wiping portion 42b contacts the front windshield G during the releasing of the lock back state. In this example, a part of the basal portion 42a of the blade rubber 42 forms the impact absorbing portion 42f. That is, during the releasing of the lock back state, the wiping portion 42b primarily collides with the front windshield G. In this case, since the wiping portion 42b inclines, the wiping portion 42b is likely to fail to absorb the impact only by the wiping portion 42b. Failure of absorbing the impact leads to incline and move the case 43 toward the front windshield G. This is likely to bring the case 43 into contact with the front windshield G. The impact absorbing portion 42f is arranged at the portion, which is likely to contact the front windshield G at this time.

The wiping portion 42b includes a basal portion formed with a cooling hole 42g, which extends along the longitudinal direction. The cooling hole 42g functions to sufficiently cool the blade rubber 42 during formation of the blade rubber 42. The blade rubber may not have the cooling hole 42g.

The above modified example has characteristic advantages as discussed below in addition to the advantages same as in the above embodiment.

The wiping portion 42b includes the lowest portion, which connects with the resin member 45. The resin member 45 is harder than the resilient member 44, which forms the basal portion 42a. Accordingly, when the blade rubber 42 is pushed toward and contacts the front windshield G, the blade rubber 42 can contact the front windshield G by a short length in the width direction. This reduces the friction force to be generated during the wiping. In addition, the resin member 45 has a compatibility with the resilient member 44. This improves the coupling force between the two members as compared to a blade rubber, which includes two members (e.g., natural rubber and polyethylene) coupled to each other by two color extrusion or the like without considering material properties between two members. Accordingly, the present invention allows for the two members so as not likely to be separated from each other, and to increases durability of the blade rubber 42.

The case 43 and the basal portion 42a include the inclination surface 42e, 43c, which are arranged at the opposite side of the starting direction at the time of starting the wiping with respect to the case 43 and the basal portion 42a. The inclination surface 42e, 43c incline by a rising slope toward the starting direction in the cross-section, which is perpendicular to the longitudinal direction. The inclination surfaces 42e, 43c continue to each other without having a step difference. Accordingly, when the wiper blade is arranged so as to extend generally along the lower end of the front windshield G, the inclination surface 42e, 43c are capable of flowing air stream during vehicle running smoothly upward and rearward in the vehicle. This reduces operation resistance during the backward moving operation, for example. In addition, the air stream during vehicle running is changed to a pushing force directing toward the front windshield G (downward). This suppresses the case 43 and the blade rubber 42 from rising off the front windshield G and improves wiping ability.

The inclination surface 42e, 43c are arranged at the entire portions of the case 43 and the blade rubber 42 that are arranged at the opposite side of the starting direction at the time of starting the wiping with respect to the case 43 and the basal portion 42a. Accordingly, when the wiper blade is arranged so as to extend generally along the lower end of the front windshield G, the inclination surface 42e, 43c are capable of flowing air stream during vehicle running smoothly upward and rearward in the vehicle. This reduces an operation resistance during the backward moving operation, for example. In addition, the air stream during vehicle running is changed to a pushing force directing toward the front windshield G (downward). This suppresses the case 43 and the blade rubber 42 from rising off the front windshield G and improves the wiping ability.

The case 43 has the upper portion. The upper portion includes the convex part 43d arranged at the opposite side of the starting direction. Accordingly, the convex part 43d increases the surface area of the inclination surface 43c. In addition, the convex part 43d suppresses the negative pressure from being generated in the upper part of the case 43. This further suppresses the case 43 and the blade rubber 42 from rising off the front windshield G. That is, when the wiper blade is arranged so as to extend generally along the lower end of the front windshield and when the case 43 does not include the convex part 43d, air stream (separated flow) which flows to separate from the inclination surface is generated at this portion so as to generate the negative pressure at this portion. The negative pressure generates the force, which acts to raise the case 43. Since the convex part 43*d* is formed, the negative pressure is suppressed to generate. Accordingly, this configuration further suppresses the case 43 and the blade rubber 42 from rising off the front windshield G and further improves the wiping ability.

When releasing the lock back state of the vehicle wiper, the wiping portion 42*b* receives the force that is greater than the biasing force generated from the biasing mechanism so as to bring the wiping portion 42*b* into contact with the front windshield G. In the above configuration, the impact absorbing portion 42*f* is arranged at the part of the blade rubber 42 that contacts the front windshield G at the time after the wiping portion 42*b* contacts the front windshield G during the releasing of the lock back state. This suppresses the impact acting on the front windshield G. That is, when releasing the lock back state of the vehicle wiper, the rubber holder receives the force that is greater than the biasing force generated by the biasing mechanism and along the direction same as the biasing force generated by the biasing mechanism. At this time, the impact cannot be absorbed only by the wiping portion 42*b* due to the inclination of the wiping portion 42*b*. This inclines the case 43 so that the case 43 is likely to collide with the front windshield G. The case 43, which is harder than the resilient member 44 is prevented from colliding the front windshield G. This suppresses the impact acting on the front windshield G. In addition, the impact absorbing portion 42*f* is formed with the blade rubber 42 (resilient member 44) as a single member. Accordingly, the impact which acts on the front windshield G is suppressed by using elasticity of the blade rubber 42 without adding any other component.

Figure 15:
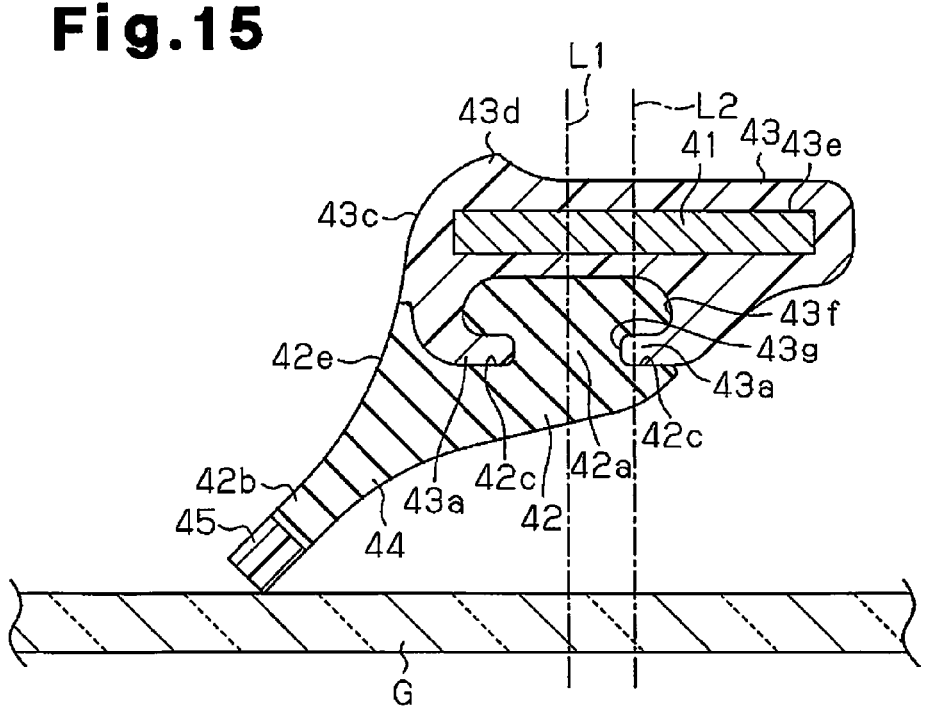
FIG. 15 is a cross-sectional view of a vehicle wiper in another example.

The above example (see FIGS. 13 and 14) may be changed as shown in FIG. 15. In the above example, the center L1 between the gripping portions 43*a* in the width direction coincides with the center L2 of the backing 41 in the width direction. The center L1 between the gripping portions 43*a* in the width direction may be located at a position moved toward the opposite side of the starting direction at the time of starting the wiping from the center L2 of the backing 41 in the width direction. When the center L1 between the gripping portions 43*a* in the width direction is moved toward the wiping portion 42*b* as discussed above, material for the blade rubber 42, which is consumable can be reduced. In this example, the center L1 in the width direction is set at a position moved toward the starting direction at the time of starting the wiping from a center of an assembly including the blade rubber 42 and the case 43 in the width direction. In this example, the cooling hole 42*g* is eliminated. In FIG. 15, same reference numerals are applied to same or similar parts as in the above example (see FIGS. 13 and 14) and a detailed explanation is omitted.

Figure 16:
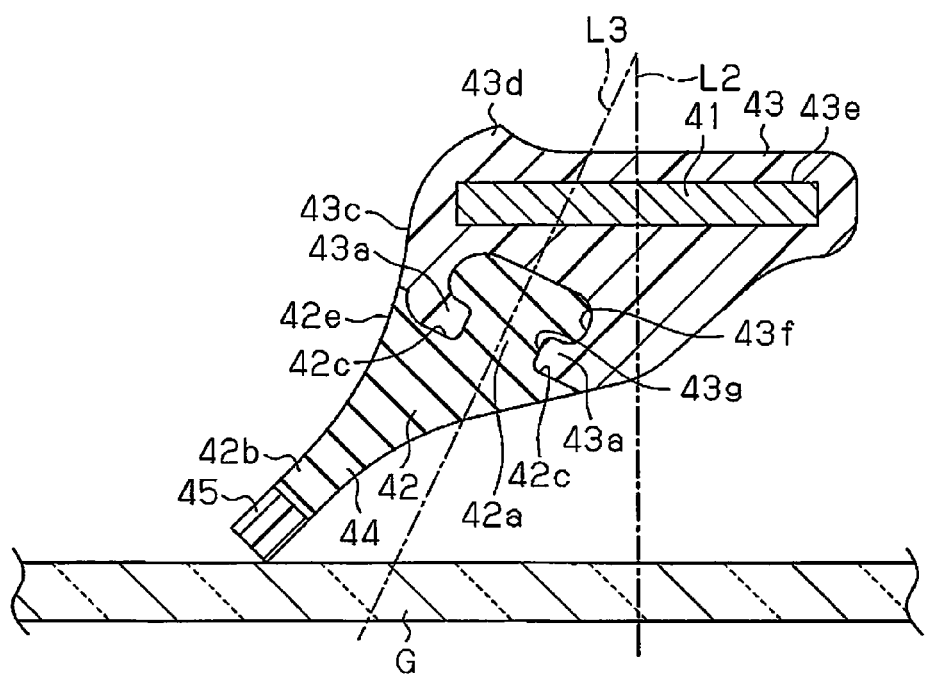
FIG. 16 is a cross-sectional view of a vehicle wiper in another example.

The above example (see FIGS. 13 and 14) may be changed as shown in FIG. 16. In the above example, the pair of the gripping portions 43*a* are symmetrically arranged in the width direction with respect to the center L2 of the backing 41 in the width direction (or with respect to the downward hanging direction). However, the pair of the gripping portions 43*a* may be symmetrically arranged with respect to a center line L3, which inclines from the center L2. This configuration can reduce the material for the blade rubber 42, which is consumable. In FIG. 16, same reference numerals are applied to same or similar parts as in the above example (see FIGS. 13 and 14) and a detailed explanation is omitted.

Figure 17:
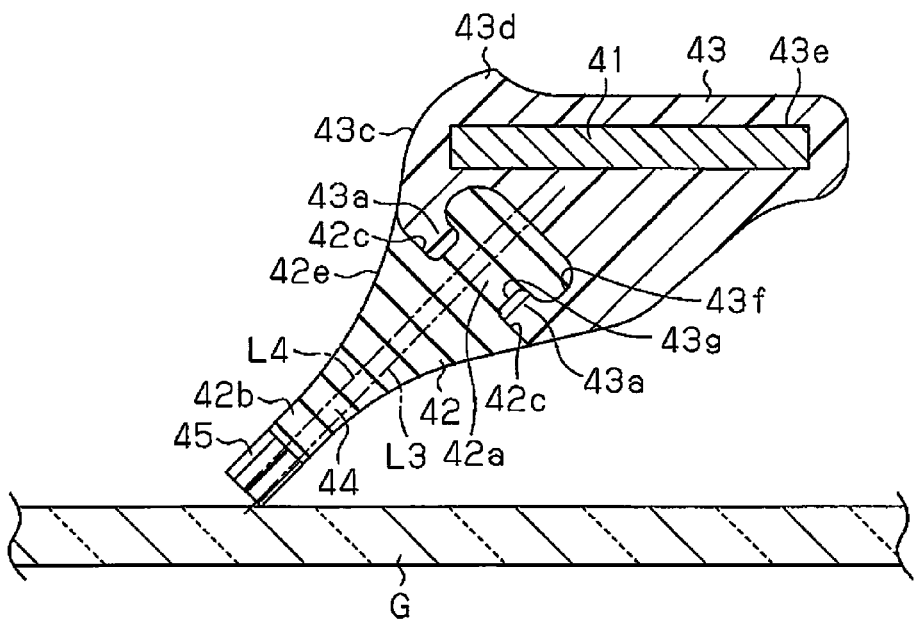
FIG. 17 is a cross-sectional view of a vehicle wiper in another example.

As shown in FIG. 17, a center line L3 and a center line L4 may be parallel to each other. Specifically, the center line L3 may be parallel to the center line L4 of the wiping portion 42*b*, which is in the state of being pushed toward and contacted with the front windshield G. This configuration can reduce the material for the blade rubber 42, which is consumable. In FIG. 17, same reference numerals are applied to same or similar parts as in the above example (see FIGS. 13 and 14) and a detailed explanation is omitted.

In the above example, the case 43 and the blade rubber 42, which includes the resin member 45 are separately formed, and the blade rubber 42 is assembled to the case 43. However, the present invention is not limited to this. The blade rubber 42 and the case 43 may be integrally formed by multicolor extrusion or the like. This allows for the case 43 to retain the blade rubber 42.

Figure 18:
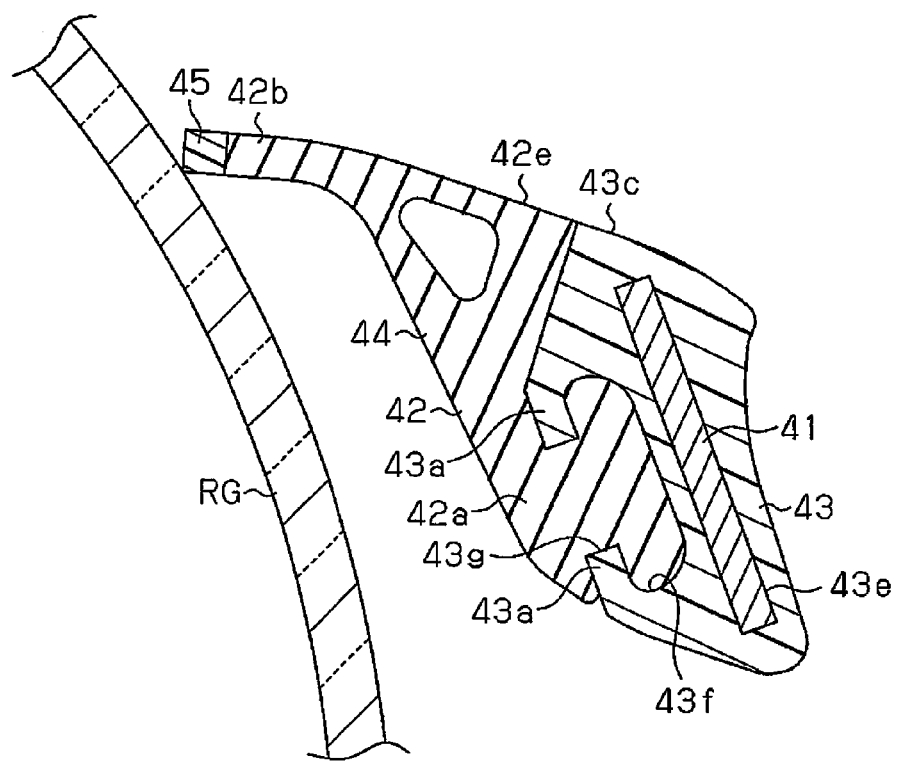
FIG. 18 is a cross-sectional view of a vehicle wiper in another example.

As shown in FIG. 18, a vehicle wiper device may be arranged on a rear windshield RG serving as a wiped surface. In this configuration, inclination surfaces 42*e*, 43*c* incline with respect to a vertical direction so as to extend from the rear windshield RG by a descending slope when the blade rubber 42 and the case 43 are positioned at a stop position. This configuration effectively prevents accumulation of trash such as dead leaves in the blade rubber 42 and the case 43.

In the above examples (see FIGS. 13 to 18), the resin member 45 and the resilient member 44 are described respectively as polyethylene terephthalate (PET) and thermoplastic elastomer polyester (TPEE) of ester series. These materials may be changed, but compatibility is required. For example, the resin member 45 in the above example may be changed to polyester of ester series.

For example, the resin member 45 may be polypropylene (PP), polyethylene (PE) and polyphenylene ether (PPE) of olefin series. The resilient member 44 may be ethylene-propylene-diene terpolymer (EPDM), nitrile rubber (NBR) and ethylene-propylene rubber (EPM) of olefin series.

For example, the resin member 45 may be polystyrene (PS) of styrene series. The resilient member 44 may be styrene-butadiene rubber (SBR), epoxy resin (EP), epoxy acrylate (EPA), ethylbenzene (EB), cis-1,4 polybutadiene rubber (BR), isoprene rubber (IR), hydrogenation (styrene)-butadiene rubber and hydrogenation polyisobutylene of styrene series.

For example, the resin member 45 may be silicone (resin). The resilient member 44 may be silicone (elastomer). For example, the resin member 45 may be polytetrafluoroethylene (PTFE). The resilient member 44 may be fluoro-rubber.

What is claimed is:

1. A vehicle wiper device, comprising:
   a rubber holder defining a backing receiving portion including an opening receiving a plate-shaped backing, the backing receiving portion defining a first surface extending in a longitudinal direction and a width direction, the width direction being perpendicular to the longitudinal direction;
   a blade rubber elongated in the longitudinal direction and including a basal portion retained by a rubber receiving portion of the rubber holder, and a wiping portion extending downward from the basal portion; and
   wherein:
   the wiping portion slidably contacts and wipes a wiped surface along the width direction,
   the wiping portion extends along an extending direction defined by a central axis of the wiping portion extending from the basal portion to the wiped surface, the central axis is parallel to and intersects the wiping portion, the wiping portion comprising a portion having a uniform thickness along the central axis, the thickness being measured perpendicularly to the central axis, the wiping portion has a cross-sectional shape so that the extending direction of the wiping portion inclines with respect to a downward hanging direction over an entire length of the blade rubber in the longitudinal direction, the length extending from one terminal longitudinal end of the blade rubber to another terminal longitudinal end of the blade rubber, when the blade rubber is in an unloaded state, the cross-sectional shape is a shape of a cross-sectional surface of the wiping portion, the cross-sectional surface extending along a direction perpendicular to the longitudinal direction, the downward hanging direction is a direction which extends along the direction perpendicular to the longitudinal direction and the width direction, and is a direction which extends along a direction perpendicular to the first surface of the backing receiving portion, the width direction being perpendicular to both the longitudinal direction and the downward hanging direction, the wiping portion is offset from the backing receiving portion in the width direction such that the uniform-thickness portion cannot be intersected by an axis perpendicular to and intersecting the first surface of the backing receiving portion over the entire length of the blade rubber in the longitudinal direction during a wiping operation including a reversing operation, and the rubber holder and the basal portion include inclination surfaces, respectively, which are arranged at an opposite side of a starting direction at a time of starting the wiping, the inclination surfaces extend toward the starting direction and incline by a rising slope in the cross-sectional surface extending along the direction perpendicular to the longitudinal direction, and the inclination surfaces form one surface having a continuously rising slope.

2. The vehicle wiper device according to claim 1, wherein the wiping portion includes a distal end inclined portion, which is arranged at a lower end part of the wiping portion, and the distal end inclined portion has an inclination direction, which is closer to the downward hanging direction than an inclination direction of an upper part of the wiping portion.

3. The vehicle wiper device according to claim 1, wherein the wiping portion includes a distal end inclined portion, which is arranged at a lower end part of the wiping portion, and an angle formed between an inclination direction of the distal end inclined portion and the downward hanging direction is smaller than an angle formed between an inclination direction of an upper part of the wiping portion and the downward hanging direction.

4. The vehicle wiper device according to claim 1, wherein the wiping portion includes a distal end portion, the distal end portion has a width, which becomes narrower toward the wiped surface, the width is defined by a second surface, which is located at a preceding side of the wiping portion in a traveling direction during a forward moving operation, and a third surface, which is located at a preceding side of the wiping portion in a traveling direction during a backward moving operation, during the forward moving operation, a second angle is formed between the first surface and a part of the wiped surface that is located at a preceding side in the traveling direction with respect to the wiping portion, during the backward moving operation, a second angle is formed between the third surface and a part of the wiped surface that is located at a preceding side in the traveling direction with respect to the wiping portion, and the first angle is substantially the same as the second angle.

5. The vehicle wiper device according to claim 1, wherein the wiping portion includes a lower end portion, the lower end portion extends downward and toward the opposite side of the starting direction at the time of starting the wiping.

6. The vehicle wiper device according to claim 1, wherein the basal portion includes an opposite side end portion that faces toward the opposite side of the starting direction at the time of starting the wiping, and the wiping portion projects from the opposite side end portion and extends toward the opposite side of the starting direction.

7. The vehicle wiper device according to claim 1, wherein the wiping portion includes a lowest portion and a resin member, which connects with the lowest portion, at least a part of the wiping portion that is close to the basal portion includes a resilient member, the resin member is harder than the resilient member, the resin member is formed from a material, which has compatibility with the resilient member.

8. The vehicle wiper device according to claim 1, wherein the inclination surfaces are formed entirely at portions of the rubber holder and the blade rubber that are arranged at the opposite side of the starting direction at the time of starting the wiping.

9. The vehicle wiper device according to claim 8, wherein the rubber holder has an upper portion including a convex part, the convex part is arranged at the opposite side of the wiping direction in the upper portion, and the convex part increases a surface area of the inclination surfaces.

10. The vehicle wiper device according to claim 1, further comprising a biasing mechanism, which applies a biasing force to the wiping portion for pushing the wiping portion to contact the wiped surface, wherein the basal portion includes an impact absorbing portion, the impact absorbing portion is arranged at a part of the basal portion that is brought into contact with the wiped surface after the wiping portion contacts the wiped surface when the rubber holder receives an impact acting in a direction same as a direction of the biasing force from the biasing mechanism.

11. The vehicle wiper device according to claim 10, wherein the impact absorbing portion is formed with the blade rubber as a single member.

12. The vehicle wiper device according to claim 1, wherein the inclination surfaces incline with respect to a vertical direction so as to extend from the wiped surface by a descending slope when the blade rubber and the rubber holder are positioned at a stop position.

13. The vehicle wiper device according to claim 1, wherein:

the rubber receiving portion is located at a part of the rubber holder that is closer to the wiped surface than the backing receiving portion, the rubber receiving portion extending along the longitudinal direction, the rubber receiving portion receives and retains substantially an entire part of the basal portion of the blade rubber in the longitudinal direction.

14. The vehicle wiper device according to claim 13, wherein the rubber receiving portion includes a longitudinal slit, which extends along the longitudinal direction and opens toward the wiped surface, the wiping portion connects with a part of the basal portion that is located in the rubber receiving portion through the longitudinal slit.

15. The vehicle wiper device according to claim 13, further comprising:

a wiper arm; and a connector arranged at a center of the blade rubber in the longitudinal direction, and connects with a distal end of the wiper arm, wherein the rubber holder is one of two rubber holders, and the two rubber holders are arranged at two opposite sides of the connector in the longitudinal direction so that the connector is located between the two rubber holders.

16. The vehicle wiper device according to claim 1, wherein the rubber holder and the blade rubber are integrally formed so that the rubber holder retains the blade rubber.

* * * * *